Sheet 1- 2 Sheets

J. M. Swain.
Harvester Droppers.

N° 62452        Patented Feb. 26, 1867

Witnesses

Inventor:
John M. Swain
per Munn & Co
Attys

J. M. Swain.
Harvester Droppers.

N° 62452. Patented Feb. 26, 1867.

Witnesses
Inventor
John M. Swain

United States Patent Office.

JOHN M. SWAIM, OF HOWARD, INDIANA.

*Letters Patent No. 62,452, dated February 26, 1867.*

IMPROVEMENT IN HARVESTERS.

The Schedule referred to in these Letters Patent and making part of the same.

TO ALL WHOM IT MAY CONCERN:

Be it known that I, JOHN M. SWAIM, of Howard, in the county of Parke, and State of Indiana, have invented a new and improved Harvesting Machine; and I do hereby declare that the following is a full, clear, and exact description thereof, which will enable others skilled in the art to make and use the same, reference being had to the accompanying drawings, forming part of this specification, in which—

Figure 1:
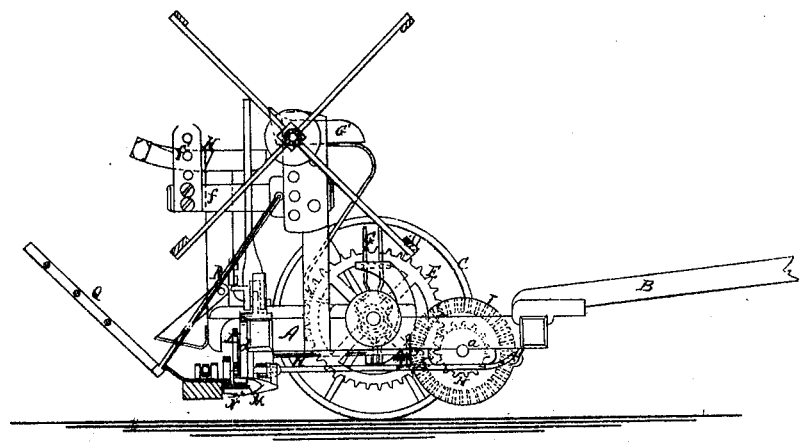
Figure 2:
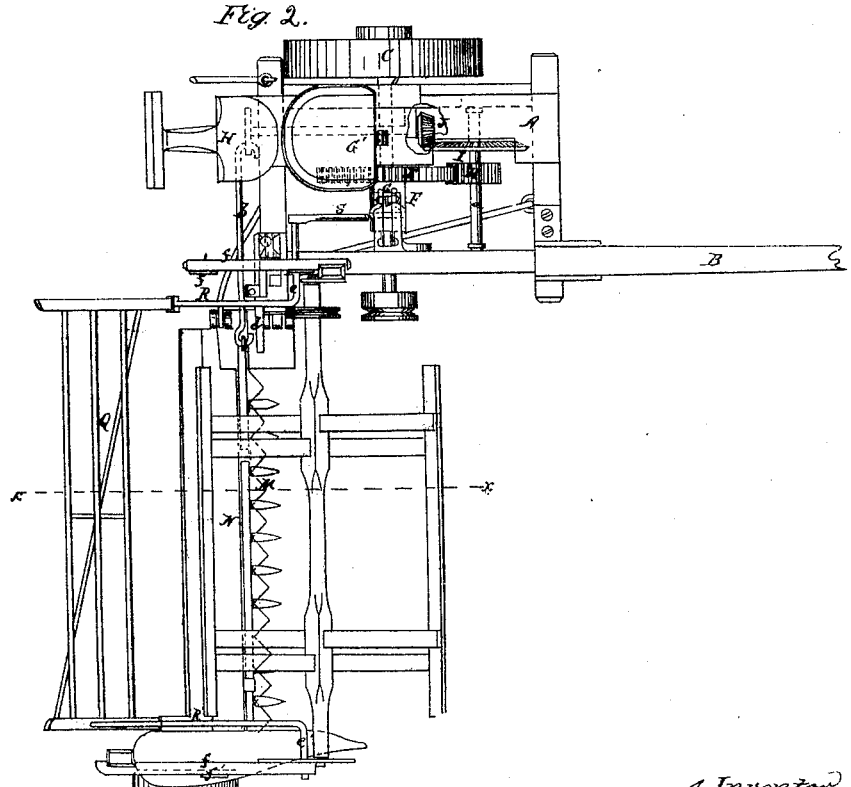

Figure 1, sheet No. 1 is a side sectional view of my invention taken in the line $x\,x$, fig. 2.

Figure 2, a plan or top view of the same.

Figure 3:
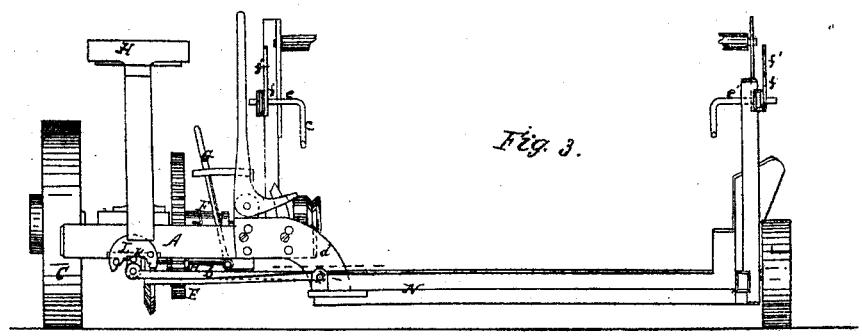

Figure 3, sheet No. 2, a rear view of the same.

Figure 4:
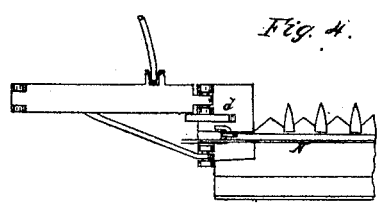

Figure 4, a plan or top view of a portion of the sickle and sickle-bar used in reaping or cutting grain, the rigid connection being also shown.

Figure 5:
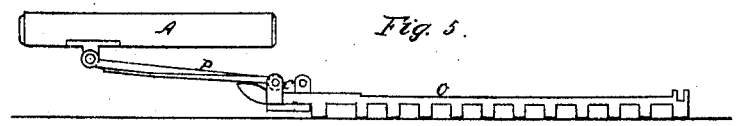

Figure 5, a rear view of the mowing-sickle bar.

Figure 6:
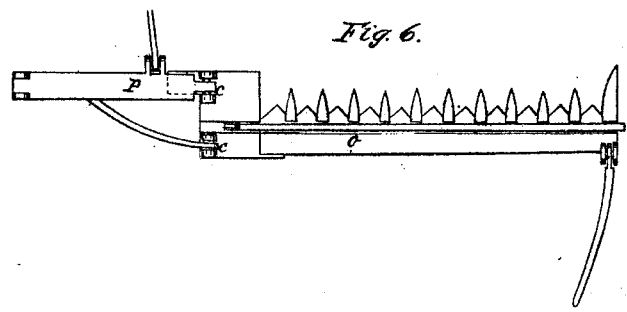

Figure 6, a plan or top view of the mowing-sickle and sickle-bar, showing its connection to the main frame of the machine.

Figure 7:
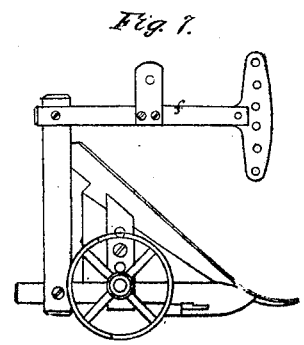

Figure 7, an end view of the machine at the grain-wheel side or end.

Similar letters of reference indicate like parts.

This invention relates to a new and improved harvester, and consists of an improved platform attachment, whereby the grain may be discharged from the machine in gavels either with or without the process of raking it off from the platform.

A represents the main frame of the machine, having a draught-pole, B, attached and a driving-wheel, C, the latter being secured to an axle, D, having a toothed wheel, E, placed loosely upon it, and which wheel may be connected with the axle so as to turn with it, when desired, by means of a clutch, F, operated by a lever, G. The wheel E gears into a pinion, H, which is secured on a shaft, $a$, in the main frame A, said shaft having upon it a bevel-wheel, I, which gears into a bevel pinion, J, on the front end of a shaft, K, the rear end of said shaft having a crank-pulley, L, upon it, from which the sickle M is driven by a pitman, $b$, (see fig. 2.) N represents the finger-bar, on which the sickle M works. This finger-bar is secured to the rear end of the main frame A, in a rigid manner, and is designed to be used in reaping or cutting grain, but in cutting grass a finger-bar, O, is employed, (see figs. 5 and 6,) which is secured to a bar, P, at the rear end of the platform, by means of joints $o$. In making a change of finger-bars all that is required is to detach one and apply the other, the rigid finger-bar N having an arm, $d$, which is bolted to the rear end of the main frame A and holds said finger-bar firm, (see fig. 3.) Q represents a grain platform, which is simply a light frame constructed of metal or wood, or both materials combined. This platform is provided with arms R R', one near each end, and the front ends of these arms are bent at right angles to the other portions, as shown at $e\,e'$, in order to form journals in which said arms may work. One of these journals $e$ is provided with a lever, S, which is within reach of the driver on seat G', said seat being in front of another seat H, the use of which will be presently shown. The journals $e\,e'$ may be fitted in different holes in bars $ff$ on the machine, or in plates $f'$ attached thereto, so that the platform may have a more or less inclined position, as desired. In reaping rye and wheat, which may be bound without any previous curing, the platform Q has an inclined position, and the driver on seat G', at suitable intervals, actuates the levers S, and thereby raises the platform Q and discharges the cut grain. In cutting oats, which require sunning or curing before being bound, the platform Q is lowered to a horizontal position by fitting the journals $e\,e'$ of the arms R R' in holes or bearings at the rear ends of the bars $ff$ or in the plates $f'$ attached thereto, and an attendant on seat H rakes the oats from the platform Q. The device may be readily transported from place to place, at considerable distances apart, by detaching the finger-bar from the main frame, which admits of the machine being readily adjusted on a truck or wagon.

Having thus described my invention, I claim as new, and desire to secure by Letters Patent—

The grain platform Q, provided with journals $e\,e'$, adapted to be fitted in bearings in bars $f$, or plates $f'$, in combination with the seats G and H, all constructed and operated substantially as described.

JOHN M. SWAIM.

Witnesses:
MICHAEL R. STANTON,
WILLIAM HUDSON.